United States Patent [19]
Nelson

[11] Patent Number: 5,154,444
[45] Date of Patent: Oct. 13, 1992

[54] AIR BAG RETAINER WITH CUTTING FLAPS
[75] Inventor: Eric S. Nelson, Middleton, N.H.
[73] Assignee: Davidson Textron Inc., Dover, N.H.
[21] Appl. No.: 680,837
[22] Filed: Apr. 5, 1991
[51] Int. Cl.$^5$ .............................................. B60R 21/16
[52] U.S. Cl. ................................... 280/732; 280/729; 280/743
[58] Field of Search ............... 280/728, 731, 732, 743; 180/90

[56] References Cited

U.S. PATENT DOCUMENTS

| | | | |
|---|---|---|---|
| 3,656,790 | 4/1972 | Truesdell | 280/743 X |
| 5,009,452 | 4/1991 | Miller | 280/743 X |
| 5,035,444 | 7/1991 | Carter | 280/732 |
| 5,046,758 | 9/1991 | Rafferty et al. | 280/732 |

FOREIGN PATENT DOCUMENTS

0428935A2 5/1991 European Pat. Off. .

Primary Examiner—Robert P. Olszewski
Assistant Examiner—Dean A. Reichard
Attorney, Agent, or Firm—Reising, Ethington, Barnard, Perry & Milton

[57] ABSTRACT

A cover assembly for an air bag restraint system has a smooth outer skin with a backing layer of foam located between the outer skin cover and a retainer member. The retainer member is located above the outlet of an air bag casing and includes a plurality of flaps therein each having a pointed end located in a hidden position beneath the foam and outer skin cover and at a point generally centrally of the outlet of the casing. Each of the flaps is connected to the retainer member by integral hinge segments in the retainer member. When the air bag is inflated, it will cause the segments to pivot outwardly about the hinge segments to pierce both the foam layer and the outer skin and peel them apart so as to form a multi-sided opening through the cover assembly for deployment of the air bag.

6 Claims, 2 Drawing Sheets

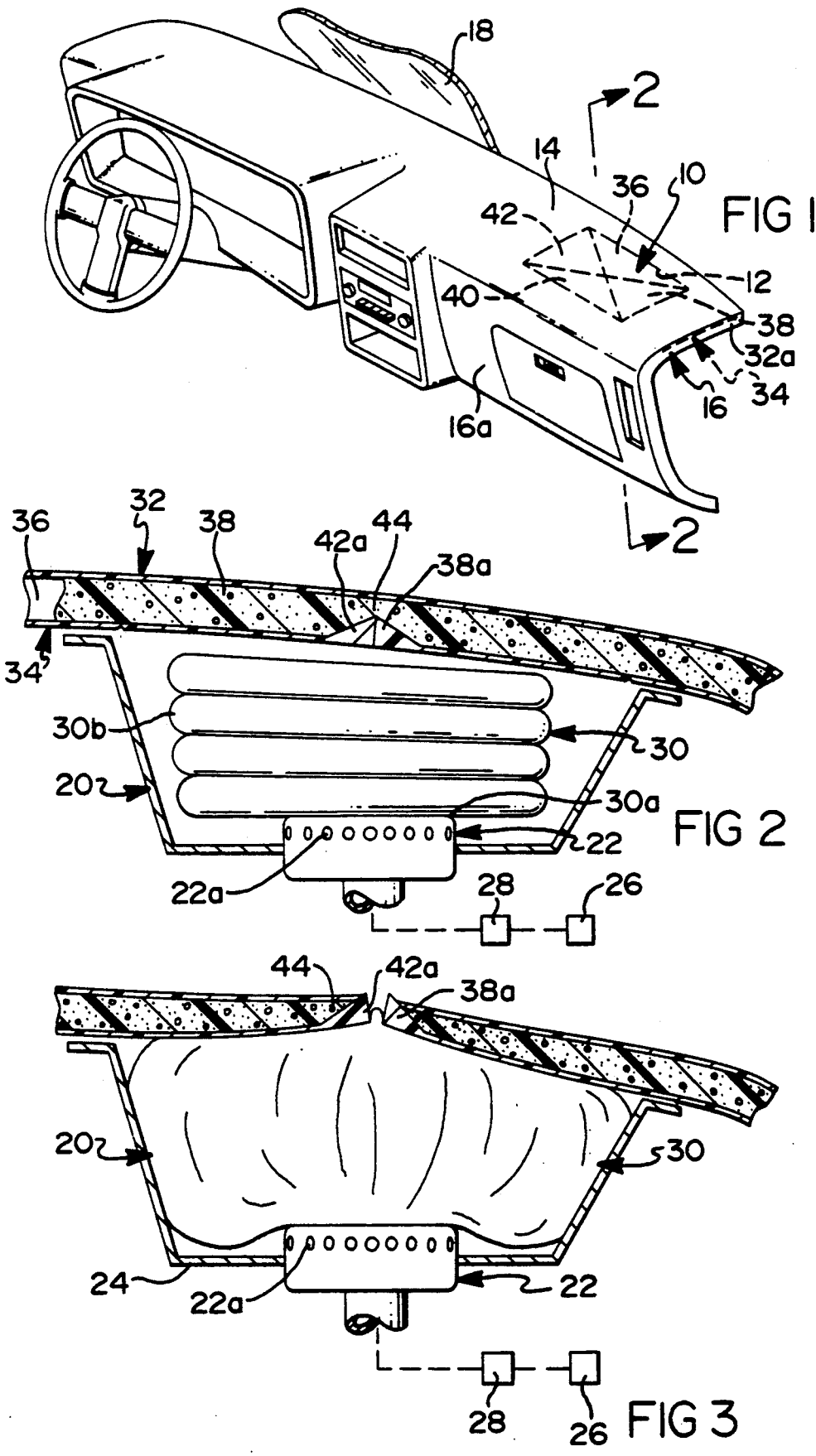

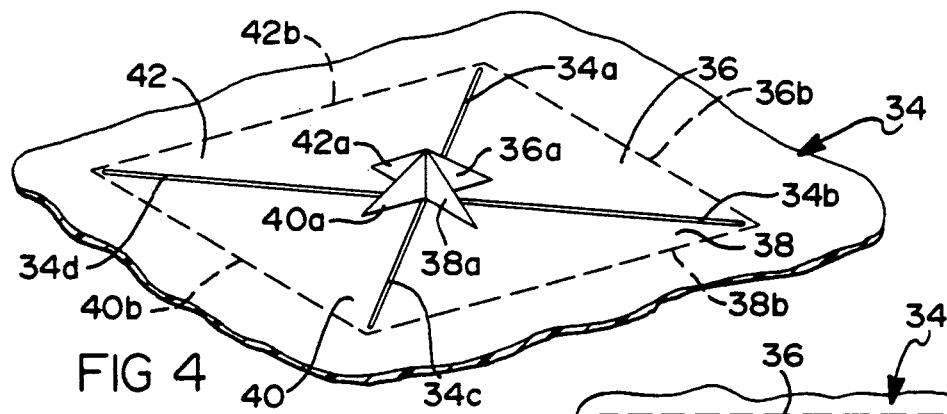
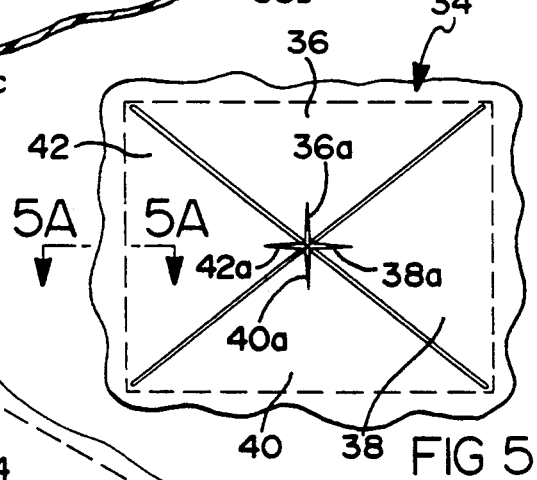
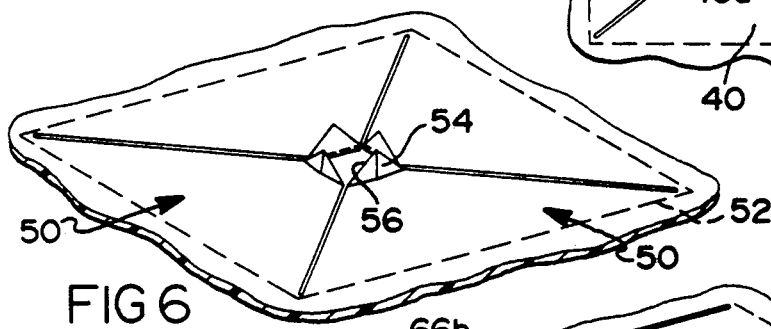
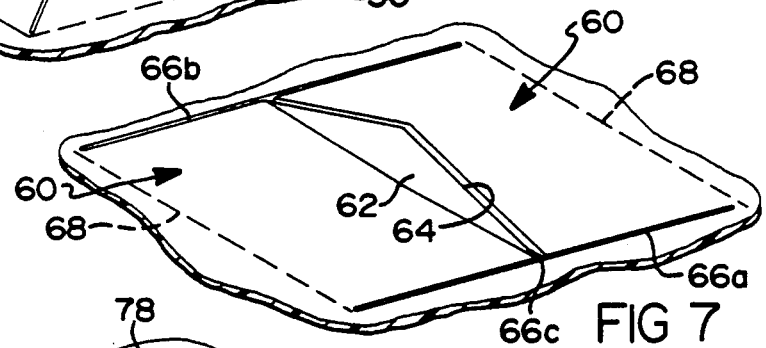
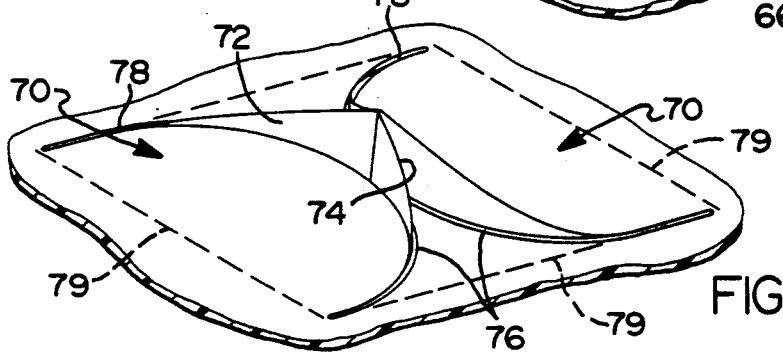

AIR BAG RETAINER WITH CUTTING FLAPS

FIELD OF THE INVENTION

This invention relates to air bag restraint systems for motor vehicles and more particularly to air bag restraint systems which are housed by a cover assembly for providing an invisible access door for deployment of the air bag following inflation thereof.

BACKGROUND OF THE INVENTION

Various air bag restraint systems have been proposed in which an access door is arranged behind a continuously formed outer skin or cover. In some cases the underside of the outer skin is perforated or weakened. In such arrangements as shown in U.S. Pat. Nos. 3,622,176 and 4,246,213 the weakened sections represent underlying depressions in the outer cover which show as an outline of an access door for an underlying air bag assembly. Furthermore, such systems require that the outer cover be torn apart at the weakened seams. If the seams are irregular in form the opening force will vary and at times may tend to impede the release of an air bag.

In other arrangements, the cover assembly includes a separate cutting device that will pierce the outer skin. Examples of such separate cutting devices are set forth in U.S. Pat. No. 4,097,064 and copending U.S. application Ser. No. 601,406 filed Oct. 22, 1990 now U.S. Pat. No. 5,035,444.

SUMMARY OF THE INVENTION

The present invention includes an invisible cover for an air bag restraint system which is easily fabricated using standard foam molding apparatus and which has a retainer with integral cutting flaps that pivot in response to air bag inflation to peel back segments of a foam layer and outer skin to form a deployment opening for passage of the air bag into the passenger compartment of the vehicle.

A feature of the present invention is to preform the cutting flaps in a retainer member of a foamed interior trim product of the vehicle of the type having an outer skin of plastic material, an intermediate foam layer for providing a soft feel and a retainer member for supporting the interior trim product within the vehicle; the flaps are formed as separate segments in the retainer each having a pointed end for piercing the foam and outer skin and each having an integral hinge section at one end for allowinq pivotal movement of the flaps so as to peel the foam layer and outer skin to form an air bag deployment opening.

Still another feature of the present invention is to provide a cover assembly for concealing an air bag restraint assembly including an air bag, a housing for the air bag, a gas generator located in the housing for supplying gas to the air bag in response to vehicle impact; the cover assembly comprising an outer skin which covers the interior trim product and including a backing layer of foam behind the outer skin for supporting the outer skin; a retainer member underlying the foam backing layer has a portion thereof divided into a plurality of flaps formed therein each having pointed ends thereon located centrally of the outlet from an air bag housing; each of the flaps are integrally connected to the retainer member at a weakened section defining a hinge for pivotal movement to cause the pointed ends to penetrate both the foam layer and the outer skin to pierce and peel back segments of the foam backing layer and outer skin to form an opening therethrough for deployment of an air bag into the passenger compartment of a vehicle when inflated by the gas generator.

A still further feature of the present invention is to provide a cover assembly for concealing an air bag restraint assembly including an air bag, a housing for the air bag, a gas generator located in the housing for supplying gas to the air bag in response to vehicle impact the cover assembly comprising: an outer skin covering an interior trim product and including a backing layer of foam behind the outer skin for defining a surface configuration on the outer skin; a retainer member underlying the foam backing layer has a portion thereof divided into a plurality of separate triangular flaps having their apexes located centrally of the outlet from an air bag housing; each of the triangular flaps has its base integrally connected to the retainer at a weakened section hinge line that allows pivotal movement of the flaps to cause the apexes to penetrate both the foam layer and the outer skin to pierce and peel back segments of the layer and outer skin to form an opening therethrough for deployment of an air bag into the passenger compartment of a vehicle when inflated by the gas generator.

In the construction of soft foam insert doors a preformed outer skin or shell member formed by casting vinyl particles on a heated mold surface is seated in a female cavity of a foam mold as setforth in U.S. Pat. Nos. 4,784,366 and 4,873,032, which are commonly assigned to the assignee in the present application, and are incorporated herein by reference. These patents disclose how a first retainer member is supported at construction holes on the lid of the mold which closes to form a mold space between the retainer and the preload vinyl skin. The retainer on the lid can also include a port through which foam precursors are directed into the mold space for reaction therein to form a cellular foam material that is soft to the feel. The resultant structure is removed from the foam mold and includes a vinyl skin which can be colored and grained to match the aesthetic appearance of the outer vinyl surface of an interior trim product such as an instrument panel having a upper opening therein for the deployment of an air bag. In the past, the retainer member has been weakened at a door segment but has required separate cutters. In the present invention, the cutters are formed integral of the retainer. Moreover, the integral flaps forming the cutters are hidden from view and do not pierce the frame until pivoted in a direction to perform a "peeling" of the backing foam and outer cover.

BRIEF DESCRIPTION OF THE DRAWINGS

Other advantages of the present invention will be readily appreciated as the same become better understood by reference to the following detailed description when considered in connection with the accompanying drawings wherein:

FIG. 1 is a perspective view of an instrument panel or dashboard which is one suitable interior trim product for housing and providing an opening for deployment of an inflatable restraint into the passenger compartment of a motor vehicle;

FIG. 2 is an enlarged sectional view of one embodiment of the invention taken along the line 2—2 of FIG. 1; and FIG. 3 is an enlarged sectional view like FIG. 2 but showing the retainer in an initial peel back air bag deployment position.

FIG. 4 is a perspective view of the retainer showing the integral cutting flaps in the embodiment of FIGS. 1–3;

FIG. 5 is a top elevational view of the retainer in FIG. 4;

FIG. 5A is an enlarged sectional view through line 5A—5A of FIG. 5; and

FIGS. 6–8 are perspective views of retainers in other embodiments of the invention.

DESCRIPTION OF PREFERRED EMBODIMENTS OF THE INVENTION

Referring now to FIG. 1, a door assembly for an opening through which an inflatable restraint safety device is deployed into a passenger compartment is shown at 10. In this embodiment of the invention the door assembly 10 is shown in a top mount position and forming a hidden opening 12 in the surface 14 of a dashboard or instrument panel 16. The door assembly 10 is in an underlying relationship to a sloped front windshield 18. While shown in the upper surface of the instrument panel, the opening could also be formed in the front surface 16a of the instrument panel 16 in what is known as a mid-mount position. The top mount or midmount of the door assembly 10 depends upon the location of an underlying air bag restraint system 20. In the illustrated embodiment of FIG. 1, the air bag restraint system 20 includes a gas generator or canister 22 located in a canister housing or casing 24 mounted on a suitable vehicle component not shown. The gas generator has a plurality of openings 22a through which a suitable inflatant gas flows when an impact sensor 26 is actuated upon vehicle impact to condition a controller 28 to initiate gas generation all as is well known to those skilled in the art. The inflatant is directed into the interior of an inflatable air bag 30 connected at one end 30a to the casing 24 and having convolutions 30b which expand as the air bag is inflated to impact against the underside of the door assembly 10 to cause it to peel apart for deployment of the air bag 30 through the opening 12.

In accordance with the invention, the door assembly 10 includes a vinyl outer skin or cover 32 which can be formed from cast vinyl material by processes such as those set forth in U.S. Pat. Nos. 4,664,864 and 4,784,911, all commonly assigned to the same assignee as in the present application. Such outer covers 32 have colors and grain appearances that are accurately matched to the appearance of the surface of an associated interior trim product such as the illustrated instrument panel. The vinyl outer skin or cover 32 has edge portions 32a thereon bent over the peripheral edge of an instrument panel retainer 34 of the type which is mounted on a lid of a foam mold apparatus such as illustrated and described in U.S. Pat. No. 4,806,094, commonly assigned to the same assignee as the present invention and incorporated herein by reference.

In accordance with the present invention, the retainer is carried on mold apparatus lids and is located thereon so as to form a sealed connection with respect to the periphery of the outer skin or cover 32 so as to define a space 37 into which foam precursors are directed in a known manner for reaction to form a soft feel foam layer 38 behind the cover 32 The foam layer 38 forms a backing to support the outer cover 32 to produce a finished appearance that matches the styling and appearance of other associated interior trim components.

In accordance with one feature of the present invention, the retainer 34 has diagonally arranged cross openings 34a–34d therein forming the sides of four flaps 36, 38, 40 and 42 located in the plane of the remainder of the retainer 34. The retainer 34 is connected to vehicle frame members for supporting the instrument panel 16 within the vehicle. It is located such that the diagonally crossed openings 34a–34d intersect centrally of the outlet opening from the casing 24 for the air bag. The flaps 36–42, in this embodiment, have a triangular shape and the apexes of each of the flaps have integral pointed cutting portions at 36a–42a to pierce a foam layer 38 located intermediate the retainer member 34 and the outer skin or cover 32 when the flaps 36–42 are pivoted outwardly as shown in FIG. 3. The bases of the triangular flaps 36–42 are connected at integrally weakened sections 36b–42b to the remainder of the retainer 34 to form hinges for upward and outward pivotal movement of each of the flaps as shown in FIG. 3. The cutting portions or members 36a–42a provide initial piercing of the foam layer 38 and outer skin 32. As shown in FIG. 4, openings 34a–34d have opposite upper edges 34e located in the plane of an outer surface 35 of the retainer. Surface 35 is parallel to outer skin 32.

While triangular flaps are illustrated, other forms of flaps may be formed in the retainer at a point above the outlet of the casing so long as the flaps are integral to the retainer and have a cutting end and a hinged end. For example, the flaps may have a truncated cone shape as shown at 50 in FIG. 6 with a weakened hinge segment 52. Flat end portions 54 have cutting edge 56 which severs a generally square segment from the foam and outer cover as the foam and outer skin are peeled apart to form an opening for deployment of the bag. FIG. 7 shows an H-pattern opening wherein the flaps 60 are rectangular with pointed integral cutting portions 62 with cutting edges 64.

Openings 66a–66c form the H-pattern. Weakened integral hinges 68 join each flap to the retainer. FIG. 8 shows a scalloped pattern opening wherein the flaps 70 are curvilinear with pointed integral cutting portions 72 having cutting edges 74. Openings 76, 78 form the flaps 70. Integral weakened hinges 79 join the flaps 70 to the retainer.

In all cases, deployment of an air bag causes it to impact the inside surface of the retainer 34 to force the flaps upwardly and outwardly so as to produce a peeling type opening until the overlying cover material is fully peeled back to define an opening more or less congruent with the outline of the weakened segments in the retainer.

The door assembly of the subject invention thereby provides a soft skin door that is easily matched to adjacent interior trim products having foamed in place material and wherein the door assembly can be formed by standard foam molding apparatus without requiring special modifications to retainer components without modification of the lid for carrying such retainers and wherein the retainer has integral cutting flaps therein that are invisible from the exterior of an interior trim product so that a passenger is unaware of the underlying air bag restraint system. While the invention is shown in association with a dashboard or instrument panel, it is equally suitable for use with other interior trim products such as driver side steering wheel housings. The arrangement is manufactured not only with standard equipment practicing standard steps, it enables the door to be made by less steps and with less components and in a more cost effective manner than cutter assemblies of the prior art.

The invention has been described in an illustrative manner, and it is to be understood that the terminology which has been used is intended to be in the nature of words of description rather than of limitation.

Obviously, many modifications and variations of the present invention in light of the above teachings may be made. It is therefore, to be understood that within the scope of the appended claims, the invention may be practiced otherwise than as specifically described.

What is claimed is:

1. A cover assembly for concealing an air bag restraint assembly including an air bag, a housing for the air bag, a gas generator located in the housing for supplying gas to the air bag in response to vehicle impact the cover assembly comprising:

an outer skin covering an interior trim product within the vehicle and a foam layer behind said outer skin for supporting said outer skin;

a retainer member underlying said foam layer and having a portion thereof with an outer surface located in a plane formed parallel to the plane containing the outer skin and further including an inner surface exposed to the air bag upon deployment thereof, said portion having preformed intersecting openings completely therethrough with upper edges located in the plane of said outer surface for separating said portion into a plurality of segments having an outer surface in the plane of said portion and a hinge portion formed integrally of said retainer member, each of said hinge portions formed as a V-shaped groove in said inner surface, each of said segments having a separate apex, a cutting member located on the outer surface of said portion at each of said segments solely at the separate apex thereof whereby said cutting members are located only centrally of the outlet from the air bag housing;

each of said hinge portions integrally connected by a weakened section hinge line to said retainer member for allowing pivotal movement of said segment to cause said cutting members to penetrate both said foam layer and said outer skin at a point thereon only located axially of a point centrally of the outlet from the air bag housing to initially pierce said outer skin at a point located only centrally of the outlet from an air bag housing and said openings having an upper edge located below said cutting member and engageable with said foam layer and said outer skin to peel back segments of said foam layer and outer skin to form an opening therethrough for deployment of an air bag into the passenger compartment of a vehicle when inflated by said gas generator.

2. A cover assembly for concealing an air bag restraint assembly including an air bag, a housing for the air bag, a gas generator located in the housing for supplying gas to the air bag in response to vehicle impact the cover assembly comprising:

an outer skin covering an interior trim product within the vehicle and a foam layer behind said outer skin for supporting said outer skin;

a retainer member underlying said foam layer said retainer member having a portion with an outer surface located in a plane formed parallel to the plane containing the outer skin and further including an inner surface exposed to the air bag upon deployment thereof, said portion having intersecting openings therethrough with upper edges located in the plane of said outer surface for separating said portion and said intersecting openings being crossed openings defining a plurality of preformed separated flaps with upper edges located in the plane of said outer surface for separating said portion, each of said preformed separated flaps having a separate apex, a cutting member located on the outer surface of said portion at each of said preformed separated flaps only at the separate apex thereof, each of said preformed separated flaps integrally connected to said retainer member by a weakened section hinge line for allowing outward pivotal movement of said flaps to cause said cutting members to penetrate both said foam layer and said outer skin to pierce and peel back segments of said foam layer and outer skin to form an opening therethrough for deployment of an air bag into the passenger compartment of a vehicle when inflated by said gas generator; each of said hinge portions formed as a V-shaped groove in said inner surface.

3. A cover assembly for concealing an air bag restraint assembly including an air bag, a housing for the air bag, a gas generator located in the housing for supplying gas to the air bag in response to vehicle impact the cover assembly comprising:

an outer skin covering an interior trim product within the vehicle and including a foam layer behind said outer skin for supporting said outer skin;

a retainer member underlying said foam layer and having diagonally crossed openings therein dividing said retainer member into a plurality of preformed separated segments, each of said preformed separated segments having an outer surface located in spaced parallelism with said outer skin and further including an inner surface exposed to the air bag upon deployment thereof, and each of said preformed separated segments having a separate apex; a separate cutting member only on each of said separate apexes; a separate hinge connecting each of said preformed separated segments to said retainer member, each of said hinge portions formed as a V-shaped groove in said inner surface;

each of said separate segments connected at said separate hinge to said retainer member by said V-shaped groove for allowing outward pivotal movement to cause said cutting members to initially penetrate both said foam layer and said outer skin at a point thereon only centrally of the outlet from the air bag housing to pierce and peel back segments of said foam layer and outer skin to form an opening therethrough for deployment of an air bag into the passenger compartment of a vehicle when inflated by said gas generator.

4. A cover assembly for concealing an air bag restraint assembly including an air bag, a housing for the air bag, a gas generator located in the housing for supplying gas to the air bag in response to vehicle impact the cover assembly comprising:

an outer skin covering an interior trim product within the vehicle and a foam layer behind said outer skin for supporting said outer skin;

a retainer member underlying said foam layer and having crossed straight openings dividing said retainer into a plurality of preformed separated flaps each having an outer surface located in parallelism with said outer skin and each further having an apex on one end and a hinge on the other end; a cutting member located on the outer surface only at each of said separate apexes;

each of said flaps integrally connected to said retainer member by said hinge at a weakened V-shaped section hinge line for allowing outward pivotal movement to cause said cutting members to penetrate both said foam layer and said outer skin to initially pierce at a point thereon only centrally of the outlet from the air bag housing and thereafter peel back segments of said foam layer and outer skin to form an opening therethrough for deployment of an air bag into the passenger compartment of a vehicle when inflated by said gas generator.

5. A cover assembly for concealing an air bag restraint assembly including an air bag, a housing for the air bag, a gas generator located in the housing for supplying gas to the air bag in response to vehicle impact the cover assembly comprising:

an outer skin covering an interior trim product within the vehicle and a foam layer behind said outer skin for supporting said outer skin;

a retainer member underlying said foam layer and having diagonally crossed, linear openings therethrough dividing said retainer member into a plurality of preformed separated generally triangularly shaped segments having an outer surface in parallelism with said outer skin and an apex at one end and a hinge at the opposite end; cutting members located on said outer surface only at each of said apexes;

each of said generally triangularly shaped segments connected at the opposite end thereof to said retainer member by a weakened section hinge line for allowing pivotal movement to cause said cutting members on said apexes to initially penetrate and pierce both said foam layer and said outer skin at a point in line with a point centrally of the outlet from the air bag housing and to thereafter cause said edges of said triangular flaps to separate and peel back segments of said foam layer and outer skin to form an opening therethrough for deployment of an air bag into the passenger compartment of a vehicle when inflated by said gas generator.

6. A cover assembly for concealing an air bag restraint assembly including an air bag, a housing for the air bag, a gas generator located in the housing for supplying gas to the air bag in response to vehicle impact the cover assembly comprising:

an outer skin covering an interior trim product within the vehicle and a foam layer behind said outer skin for supporting said outer skin;

a retainer member underlying said foam layer and having crossed curvilinear openings dividing said retainer into a plurality of preformed separated flaps each having cutting portions thereon only located centrally of the outlet from an air bag housing;

each of said preformed separated flaps integrally connected to said retainer member by a weakened section hinge line for allowing outward pivotal movement to cause said cutting portions to penetrate both said foam layer and said outer skin to initially pierce at a point in line with a point centrally of the outlet from an air bag housing and thereafter peel back segments of said foam layer and outer skin to form an opening therethrough for deployment of an air bag into the passenger compartment of a vehicle when inflated by said gas generator.

* * * * *